US010651437B2

(12) United States Patent
Tschiggfrei et al.

(10) Patent No.: US 10,651,437 B2
(45) Date of Patent: May 12, 2020

(54) BATTERY PACK AND METHOD FOR ASSEMBLING A BATTERY PACK

(71) Applicant: H-TECH AG, Schaan (LI)

(72) Inventors: Peter Tschiggfrei, Tisis (AT); Gerd Skala, Frastanz (AT)

(73) Assignee: H-TECH AG, Schaan (LI)

(*) Notice: Subject to any disclaimer, the term of this patent is extended or adjusted under 35 U.S.C. 154(b) by 226 days.

(21) Appl. No.: 15/309,558

(22) PCT Filed: May 6, 2015

(86) PCT No.: PCT/EP2015/059900
§ 371 (c)(1),
(2) Date: Nov. 8, 2016

(87) PCT Pub. No.: WO2015/169820
PCT Pub. Date: Nov. 12, 2015

(65) Prior Publication Data
US 2017/0194610 A1    Jul. 6, 2017

(30) Foreign Application Priority Data

May 8, 2014    (DE) .................. 10 2014 106 414
Oct. 21, 2014    (DE) .................. 10 2014 115 330

(51) Int. Cl.
H01M 2/34    (2006.01)
H01M 2/10    (2006.01)
H01M 2/20    (2006.01)

(52) U.S. Cl.
CPC ....... H01M 2/1077 (2013.01); H01M 2/1094 (2013.01); H01M 2/206 (2013.01);
(Continued)

(58) Field of Classification Search
None
See application file for complete search history.

(56) References Cited

U.S. PATENT DOCUMENTS 7,671,565 B2    3/2010    Straubel et al.
2007/0188147 A1*    8/2007    Straubel ............... H01M 2/202
320/134
(Continued)

FOREIGN PATENT DOCUMENTS

CN    102549803 A    7/2012
DE    10 2009 035 490 A1    2/2011
(Continued)

Primary Examiner — Lucas J. O'Donnell
(74) Attorney, Agent, or Firm — Vorys, Sater, Seymour and Pease LLP

(57) ABSTRACT

In order to specify a battery pack that can be simply produced, that provides sufficient heat dissipation during the assembly and during the operation of the battery pack (10) and a reliable electrical connection between the connection structures (14) and the connection contacts (33, 34) of the battery cells (11), and that copes with the failure of an individual battery cell (11), a battery pack (10) is specified, comprising: at least two battery cells (11), wherein each battery cell (11) has a positive and a negative electrical connection contact (33, 34), wherein a connection structure (14) is associated with at least the electrically positive connection contacts (33) or the electrically negative connection contacts (34) of the battery cells (11), wherein each battery cell (11) is connected to the connection structure (14) by means of at least one connection element (15, 51), wherein a cross-section of each connection element (15, 51) is matched to a predetermined maximum current of a battery cell (11), wherein the connection element (15, 51) is fastened to a side of the connection structure (14) facing the battery cells (11). Each connection structure (14) has a current strength that corresponds to the sum of the individual currents of each connected battery cell (11).

17 Claims, 5 Drawing Sheets

(52) U.S. Cl.
CPC ............. *H01M 2/34* (2013.01); *H01M 2/348* (2013.01); *H01M 2200/103* (2013.01); *H01M 2220/20* (2013.01)

(56) References Cited

U.S. PATENT DOCUMENTS

2012/0148877 A1\* 6/2012 Kalman ................ H01M 2/105
    429/7
2014/0178722 A1\* 6/2014 Straubel ................ H01M 2/105
    429/72

FOREIGN PATENT DOCUMENTS

| | | |
|---|---|---|
| DE | 10 2011 015 620 A1 | 10/2012 |
| DE | 10 2012 005 120 A1 | 9/2013 |
| EP | 2 482 362 A1 | 8/2012 |
| JP | 2010-282711 A | 12/2010 |
| JP | 2010-282811 A | 12/2010 |
| JP | 2013-532890 A | 8/2013 |
| WO | 2012/035683 A1 | 3/2012 |
| WO | 2014/038184 A1 | 3/2014 |

\* cited by examiner

BATTERY PACK AND METHOD FOR ASSEMBLING A BATTERY PACK

The present invention relates to a device for accommodating battery cells, hereinafter referred to as a battery pack, and to a method of assembling or manufacturing a battery pack.

Battery packs are used in various electrically powered devices, in particular in electric vehicles, in electrically driven bicycles, in battery-powered tools, portable computers and telephones, etc. Typically, rechargeable cells are used in such battery packs. Nowadays, lithium-based rechargeable battery cells are used in such battery packs. Rechargeable batteries differ in that they can be recharged after a first discharge process. However, this requires an appropriate circuitry for monitoring the charging and discharging process that is provided by a battery management system, for example. When connecting the individual cells within a battery pack, a reliable electrical connection between the connection structures of the battery pack and the electrical contacts of the battery cell is essential. This contact must operate reliably both during operation, i.e., under corresponding mechanical and thermal and electrical stresses, and throughout the life of the electrical device.

Furthermore, very large currents arise at the connection regions of the battery pack during charging and during discharging, in particular for large battery packs with several hundred battery cells. Where large currents flow, a lot of heat is created, the transfer of which to the battery cells must be avoided, since battery cells, in particular lithium-ion cells, can outgas or even explode in case of uncontrolled addition of heat. Therefore, various technologies are used in the prior art in order to avoid heat input effects on the cells during the assembly of the battery pack as well as during the charging and discharging process. For the avoidance of heat accumulation during the charging and discharging process, additional cooling is used, for example. However, it is also known to arrange the individual battery cells of a battery pack such that they are sufficiently ventilated, so that a generation of heat within the battery pack exceeding a permissible value is avoided. However, the effect of heat input during the assembly process and in particular during the connection process must be considered.

The attachment of connection structures of the battery pack to the individual electrical terminals of the cells is often performed by spot welding or soldering. This results in very high local heat input to the individual cells, but is required to make a reliable electrical connection. Another aspect of the design of battery packs is that, among the possibly several hundred battery cells within a battery pack, individual battery cells may fail during the operating period of the battery pack due to inhomogeneities within the cells, wherein the failure is often caused by a decreased internal resistance and, consequently, results in an increased current flow to the connection structures of the battery pack. This increased current flow may result in an uncontrolled heat build-up in the cell and also in the neighbouring cells, which can lead to a chain reaction, so that the whole battery pack outgases uncontrollably or explodes. To avoid such effects, a battery pack is required which is simple to produce and avoids one or more of the above-identified problems by design.

Therefore, the object of the invention is to provide a battery pack which is simple to produce, provides sufficient heat dissipation during assembly and during operation of the battery, provides a reliable electrical connection between the connection structures and the connection contacts of the battery cells, and can cope with the failure of an individual battery cell.

The object is achieved by the features of the independent claims.

The invention is based on the idea to provide, in a battery pack, a connection structure and appropriate electrical connections to the connection contacts of the battery cells, that, on the one hand, allow a uniform distribution of the charging current during charging and a reliable transport of the high current flow of the many individual battery cells to the connecting regions during discharging without overburdening the individual battery cells with heat. Moreover, the connection between the electrical contacts of the battery cells and the connection structure according to the invention ensures, in case of a fault or failure of a single battery cell and the generation of an extremely high current due to the failure, a reliable decoupling of the individual battery cells is ensured.

According to a solution for the object discussed above, a battery pack comprises: at least two battery cells, each battery cell comprising at least two battery cells, wherein each battery cell has a positive and a negative electrical connection contact, wherein a connection structure is connected to at least the electrically positive connection contacts or the electrically negative connection contacts of the battery cells, wherein each battery cell is connected to the connection structure by means of at least one connection element, wherein a cross-section of each connection element is matched to a predetermined maximum current of a battery cell.

Preferably, the connection element is fastened to a side of the connection structure facing the battery cells.

Each connection structure has a current strength that corresponds to the sum of the individual currents of each connected battery cell.

Preferably, a first connection structure may be associated with the electrically positive connection contacts of the battery cells, and a second connection structure with the electrically negative connection contacts of the battery cells, wherein the connection elements are respectively fastened to the sides of the connection structures, which face the battery cells.

Preferably, the battery pack may further include at least one support structure for receiving the at least two battery cells.

Preferably, the support structure may have a surface which is directed towards the connection structure, wherein said surface is broken by connection openings.

Preferably, the connection structure in the assembled state may rest on the surface of the support structure and the connection elements can pass through the connection opening.

Preferably, a first support structure may be arranged on the side of the positive electrical connection contacts, and a second support structure may be arranged on the side of the negative electrical connection contacts.

Preferably, at least one fastener may be arranged at predetermined locations between the first and second support structures to hold the two support structures and the inserted battery cells together. There may be a plurality of fasteners.

Alternatively or additionally, one or more additional fasteners may be provided to hold the two connection structures and the supporting structures receiving the battery cells together.

Preferably, the fastener may be formed from electrically non-conductive material or be surrounded by an electrically insulating material.

According to another solution for the object discussed above, a method of manufacturing a battery pack is provided, comprising the steps of: inserting at least two battery cells into a support structure, connecting a connection structure to one connection element per battery cell on a first side of the connection structure, arranging the connection structure with the fastened connection elements on the support structure, wherein the connection elements are fastened to the first side of the connection structure, which faces the battery cells, connecting the connection elements which are connected to the connection structure, to electrical connection contacts of the battery cell.

By attaching the connection elements on the side of the connection structure, which is directed towards the battery cells in the assembled state, i.e., the connection structure is inverted after the assembly of the connection elements, the connection pads are facing the support structures or battery cells. This has two major advantages. On the one hand, the connection pads are protected against external, particularly mechanical, influences and damage can be avoided. On the other hand, the connection elements have to be curved less strongly, since the distance to the connection contacts is reduced by the material thickness of the connection structures. This also has positive effects on the welded connections, both at the connection structures and on the connection contacts, since less material stress acts on the connection elements. In addition, the handling during joining/welding is improved by the less curved connection elements.

According to a solution for the object discussed above, a battery pack comprises at least two battery cells. Each battery cell has a positive and a negative electrical connection contact. A first connection structure is associated with the electrically positive connection contacts and a second connection structure is associated with the electrically negative connection contacts of the battery cells.

Since the battery cells within the battery packs receive a current during charging, which is controlled by the battery management system or by the charger, and output a high current during discharging, which is determined by the load requirement, each connection structure has a current capacity corresponding to the sum of the individual currents of the connected battery cells of the battery pack.

The electrical connection between the first connection structure and the respective electrically positive connection contacts of the battery cells included in the battery pack, and between the second connection structure and the respective electrically negative connection contacts of the battery cells included in the battery pack is provided by a connection element in each case. Accordingly, each of the connection contacts of each battery cell is connected with at least one connection element, each connection element being connected with the associated connection structure. That is, the current capacity of the connection structure is significantly greater than the current capacity of the respective connection element.

According to the invention, the cross section of the connection element, which provides the electrical connection between the electrical connection contact of the battery cell and the connection structure, is adjusted to a predetermined maximum current of a single battery cell. This ensures that only a maximum predetermined or permitted current can flow through the battery cell during discharge, because at a higher power, which can particularly occur in the event of a failure caused by a low internal resistance of the battery cell, the connection element melts, causing a decoupling of the affected battery cell from the battery pack. On the other hand, the connection elements with the defined cross section act as a current limiting element during the charging process, so that only a limited current is allowed to flow in the battery cell. Thereby, a uniform distribution of the current or a compensation of the current flowing to the battery cells is obtained. This prevents, that the battery cells, Which are closer to the current supply, are charged faster or receive a higher current than the battery cells, which are further away from this connection region.

Preferably, the battery cells located in the battery pack are connected in parallel. That is, the respective positive or negative connection contacts of the battery cells are each associated with a connection structure. As a consequence the electrically positive connection contacts and the electrically negative connection contacts are each located on one side, for example the top or bottom side of the battery pack, and the charge or discharge current can be supplied or withdrawn via a first connection structure for the electrically positive connection contacts, and a second connection structure for the electrically negative connection contacts, respectively.

In a further embodiment at least one connection structure for receiving the at least two battery cells is provided. By means of this support structure, a physical fixation of the battery cells is achieved. The battery cells are mechanically fixed via the connection structure, so that the mechanical retention forces acting on the connection elements or connection structures are kept as low as possible and they are not subjected to mechanical stress.

In a particular embodiment, the battery cells are configured as round cells including an electrically positive connection contact on a first end side and an electrically negative connection contact on the opposite end side. The invention is not limited to such round cells, however. Pouch cells as well as flat cells consisting of a plurality of round cells can also be used, wherein the electrical connection contacts of the battery cells used in each case may be arranged on the same side of the battery pack. However, then a different arrangement of the connection structures arises. Optionally, a plurality of connection structures electrically separated from each other are required on one side of the battery pack.

In a further particular embodiment, a first and a second supporting structure are provided, which are respectively disposed on opposite end sides of the battery cells, so that each of the opposite end sides of the battery cells are received in the two support structures with the corresponding electrically positive and electrically negative connection contacts. For this purpose, the support structure preferably has receiving openings, which are configured to receive at least a portion of the outer shape of each battery cell of the battery pack. Through this receiving opening, the battery cell can be received in the support structure during the assembly process and is fastened sufficiently securely, so that it cannot change its position any longer. During the fastening of the connection elements and the connection structures, the position of the electrically positive and electrically negative connection contacts can thus no longer change. Due to the configuration of the connection structure, it is also possible to define a distance between the individual battery cells by selecting or forming a distance between the receiving openings such that sufficient ventilation between the individual battery cells of the battery pack is possible. The receiving openings of the first and second support structures each have a predetermined depth, so that the respective battery cells can be inserted sufficiently safely therein. The receiving opening is configured such that the battery cells cannot fall out. Thus, a clamping connection is provided by the receiving opening.

Furthermore, each of the support structures comprises several connection openings, wherein a contacting of the connection contacts of the battery cells is carried out via or through the connection openings. Here, each connection opening is associated with the support structure of a receiving opening. That is, the connection element is passed through the connection opening to the receiving opening, and thus guided to the electric connection contact of the battery cells. For this, the respective connection opening is in communication with the corresponding receiving opening. Thus, there is a through hole between the connection opening and the receiving opening. In order to prevent the battery cells falling out or slipping out from the receiving opening towards the connection opening, the connection opening is smaller than the receiving opening.

In addition, at the same time a mechanical protection of the connection side or of the electrical connection of the battery cell is provided by the smaller connection opening which is directed outward, since a part of the end side of the battery cells is covered by at least one projection or a circumferential edge of the receiving opening. Thus, mechanical damage to the electrical connection or the insulation of the cell can be prevented. Via the thickness of the edge or projection in the receiving opening a distance between the receiving opening and the connection opening can be adjusted. The larger this distance, the higher is the mechanical and thermal protection of the electrical connection contact of the individual battery cell.

As shown above, each support structure comprises receiving openings and connection openings. The connection openings are arranged on a connection side of the support structure, wherein the receiving openings are arranged on a receiving side of the support structure. The receiving side with the receiving openings serves to receive the battery cell, wherein the connection side is provided for electrical access to the electric connection contact of the battery cells from the outside. That is, the connection sides of the respective connection structures for the battery pack are directed outwards. The receiving sides of the support structures are directed inwards with respect to the battery pack. That is, considering a single connection structure, the receiving side and the connection side are opposite to each other, thus forming a top and a bottom side of the support structure. Herein, the receiving openings are arranged on the receiving side of the support structure in order to provide structural support for the battery cells.

The connection sides of the support structures are covered with the connection structures, respectively. Thus, the first and second connection structures are each arranged on a connection side of the first and the second support structure, wherein the battery cells are arranged between the first and the second support structure.

In order to supply the charging current or withdraw the discharge current each of the connection structures includes a battery pack connection region. The battery pack connection region is arranged at an outer periphery or an outer edge of the connection structure and preferably protrudes therefrom or beyond the outer dimension of the battery pack. The battery pack connection regions are either connecting to a charger or to a consumer. When interconnecting multiple battery packs, they are used to connect the battery connection regions of a plurality of battery packs.

In order to ensure a uniform current flow through the respective connection structures, the battery pack connection regions are arranged diagonally opposed with respect to the battery pack. That is, a battery pack connection region on the electrically positive side is, for example, arranged on the upper left side, whereas the battery pack connection region of the electrically negative side is arranged on the bottom right side of the battery pack. As a result, a steady current flow through all battery cells included in the battery pack is achieved, thus avoiding a localized overheating of individual battery cells due to a non-uniform current distribution.

The connection structures are made of an electrically conductive material and are formed planar. Preferably, the connection structures cover the respective support structures completely or almost completely. Due to the planar configuration of the connection structure, a uniform current distribution to all connected battery cells is made possible. The maximum current conduction capability is defined by the cross section of the connection structure and the respective surface area, i.e., by the volume required for the conduction of the current. Since possibly more than hundred battery cells are arranged in such a battery pack and each battery cell can temporarily provide high currents, the respective connection structures must provide a sufficiently high current capacity corresponding to the sum of the individual currents of the individual battery cells. That is, in case of a maximum request, more than 100 A flow through the connection structures during the charging process and in particular the discharging process. Preferably, the connection structure is made of a metal. For this, the use of copper is expedient. However, it is also possible to form the connection structure from another electrically conductive material. The connection element, via which the connection from the connection structure to the electrical connection contact of the battery cell is established, is made of a second different metal, such as nickel or aluminium. For this, the use of a Hilumin strip is expedient. However, it is also possible to use another electrically conductive material for the connection elements.

The connection structure has contact openings. Herein, each contact opening is associated with a connection opening of the support structure. Preferably, the respective contact openings correspond to the associated connection openings, wherein it is also possible that the contact opening is larger or smaller than the connection opening of the corresponding support structure. Thus, the contact opening exposes the respective connection opening of the support structure and therefore the electrical connection contact of each battery cell positioned thereto below. Therefore, the connection structure can be contacted by means of the connection element through the connection opening into the receiving opening to the electrical connection contact of the battery cell. The connection openings may have any shape, preferably are formed substantially round such as the contact openings.

The connection elements, which are preferably formed in strip shape, are fastened by means of a joining method at the connection structure and protrude into the corresponding contact opening, respectively. As a particularly advantageous joining method, friction welding or ultrasonic welding of the connection elements to the respective connection structure has proven successful since with such a method sufficient mechanical and electrical connection between the connection structure and the connection element is achieved. The build-up of heat during the friction welding is much lower than during a spot welding method or a soldering method. In addition, it is difficult to achieve a reliable mechanical and electrical connection with a spot welding method when connecting a thicker material with a thinner material, since the energy is absorbed by the thicker material. In friction welding, however, an extensive connection is created at the respective surfaces in the materials to be joined. Herein, the two surfaces to be joined are moved relative to each other under pressure, whereby heating and plasticization of the material occurs. The surfaces to be joined are then pressed together under high pressure. Thus, a reliable mechanical and electrical connection can be achieved even with different material thicknesses and different materials.

Moreover, it is advantageous to prepare the connection structures with the respective connected connection elements such that these can be manufactured prior to the assembly of the battery pack with the individual battery cells. After the connection structure with the connection elements fastened thereto, which protrude into the contact openings, respectively, is disposed on the respective support structure, the electrical connections between the positive and negative connection contacts of the respective battery cells can be made. For this, a spot welding or soldering is also possible to ensure a reliable electrical connection of the electrical connection contact of the battery cell to the connection elements.

The connection element has a cross section Which melts at a current above a maximum charging or discharging current, whereby the connection between the connection structure and the connection element is interrupted, and thus a further flow of current is prevented. In addition, it can be prevented that a cell is excessively heated in case of failure, that the entire battery pack becomes inoperable in case of a corresponding chain reaction, and that dangerous situations can occur.

For thermal insulation, further a heat-insulating layer may be arranged between the connection structure and the support structure for example made of Teflon. Preferably, the heat-insulating layer is formed with the same dimensions and openings like the connection structure.

By means of the cross section of the connection element, a uniform current distribution to the individual battery cells connected within the battery pack can be achieved during the charging of the battery pack. When charging the battery pack, it is necessary to charge all battery cells of the battery pack uniformly, i.e., with the same current and not, as in the prior art, to charge the battery cells that are closer to the connection region of the battery pack more intensely, since then they would heat up excessively, which could lead to uncontrollable reactions. Due to the configuration of the battery pack according to the invention and in particular due to the connection structure and the connection elements attached thereto, the charging current is distributed evenly from the battery pack connection region to all battery cells of the battery pack. By means of a suitable selection or reduction of the cross section of the connection element, the amount of current flowing to the battery cell or being withdrawn from it is limited and is distributed to other battery cells during charging. During discharging, the defined cross section of the connection element ensures that, in case of an uncontrolled discharge with a current in excess of the specified maximum current of a battery, the connection element melts and is thus decoupled from the rest of the battery pack.

That is, the cross section of the connection element according to the invention functions as a safety measure when discharging the battery cells and as a limitation when charging them.

For connections of the battery cells according to the prior art, the individual battery cells are usually connected via contact strips, whereby the battery cells which are close to the battery pack connection region receive a larger current than the battery cells which are far from the battery pack connection region, in particular during charging. Thus, the battery cells arranged close to the battery pack connection region may be heated beyond an allowable temperature range and cause the above-described failure.

Since the entire battery pack may be exposed to critical heat build-ups both during manufacturing and during operation, the connection structures may be preferably made of a temperature-resistant electrically non-conductive material, preferably thermoset.

The receiving opening with its dimensions, i.e., in case of a round cell with its inner diameter, is adapted to the respective outer dimensions, i.e., the outer diameter, to the respective battery cell so as to achieve a corresponding clamping effect on the battery cell after insertion of the battery cell into the receiving opening. Alternatively or additionally, a predetermined amount of adhesive can be introduced into the receiving opening, in order to improve the fixation of the battery cell.

The external dimensions of the connection structure substantially correspond to the outer dimensions of the support structure.

The cohesion of the support structures with the inserted battery cells or the connection structures disposed on the support structures is achieved primarily through the connection between the connection element and the connection structure or the connection element and the electrical connection contact of the battery cell. However, to relieve this electrical connection mechanically as much as possible, it may be advantageous to arrange a fastener between the first and the second support structure, respectively, so as to additionally hold the battery cells inserted into the support structures together tightly between the first and the second connection structure.

The connection element is fastened to the connection structure at a connection pad, preferably by means of friction welding or ultrasonic welding. The dimensions of the connection pad can correspond to the square area of the width of the connection element. Through the extensive connection of the connection element to the connection structure, both a safe mechanical and a safe electrical connection are achieved.

The object is also achieved by a method of manufacturing a battery pack. The method preferably includes the steps of: inserting at least two battery cells into a support structure, connecting a connection structure to a connection element, wherein, for each battery cell, at least one connection element is provided at each connection structure. After connecting the connection element to the connection structure, the connection structure is aligned with the corresponding connection elements, such that the connection elements can be connected to the respective electrical connection contacts of the battery cells. Then, the other side of the battery cells is connected to the respective connection structure and the connection elements analogously.

The individual features of the first embodiment may also be applied to the second embodiment and vice versa.

In the following, embodiments of the invention will be described in detail with reference to the accompanying figures.

Figure 1:
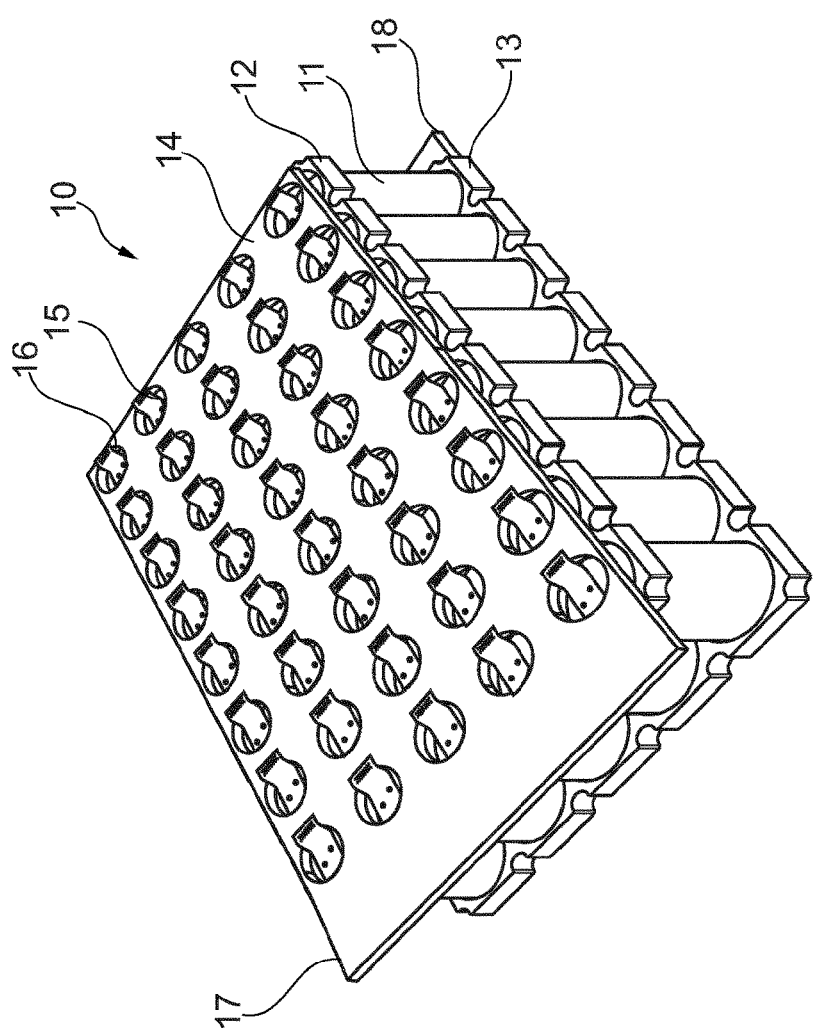
FIG. 1 shows a perspective view of a battery pack according to the invention.

FIG. 1 shows a perspective view of a battery pack 10. In this embodiment, the battery pack 10 comprises 40 battery cells 11, the end sides of which are received in support structures 12, 13, The support structures 12, 13 are covered by connection structures 14, respectively, wherein the lower connection structure is not visible in this illustration. The connection structure 14 has contact openings 16. Furthermore, the connection structure 14 includes connection elements 15, which are fastened to the connection structure 11 and each protrude into the contact openings 16. The connection elements 15 are each connected to the electrical connection contacts of the battery cells 11 via connections not specified here. The connection structure 14 includes, in the front left region thereof, a battery pack connection region 17 which protrudes beyond the support structure 12. On the bottom side a battery pack connection region 18 is visible, which extends from the lower connection structure 14 and provides a connection to other battery packs or battery chargers or loads.

Figure 2:
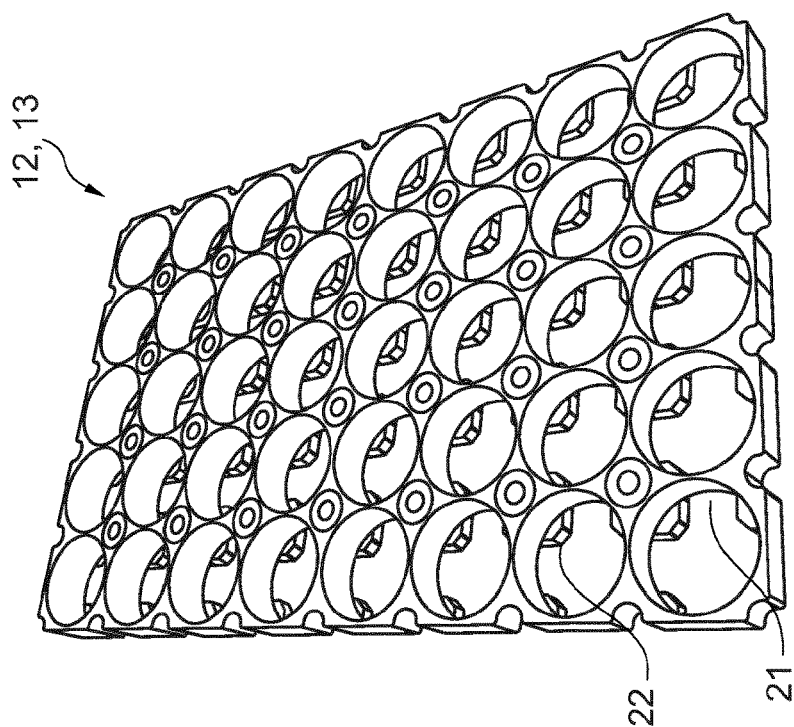
FIG. 2 shows a perspective view of a support structure.

FIG. 2 shows a perspective view of a support structure 12, 13. In FIG. 2, the support structure 12, 13 is shown from the receiving side. The receiving side is the side on which the respective receiving openings 21 are arranged. The battery cells 11 are inserted into the receiving openings 21. The support structure 12, 13 is characterized in that preferably at least one base element or projection 22 protrudes into the receiving opening 21 and acts as a support for the inserted battery cells 11. In the support structure 12, 13 according to FIG. 2, four projections 22 are provided which project into the receiving opening 21. Another element, which is visible but unspecified, is the receiving opening 21 opposite to the connection opening 23. It is shown in more detail in FIG. 3b. The connection openings 23 of the support structure 12, 13 a located on the side which is also referred to as the connection side.

Figure 3A:
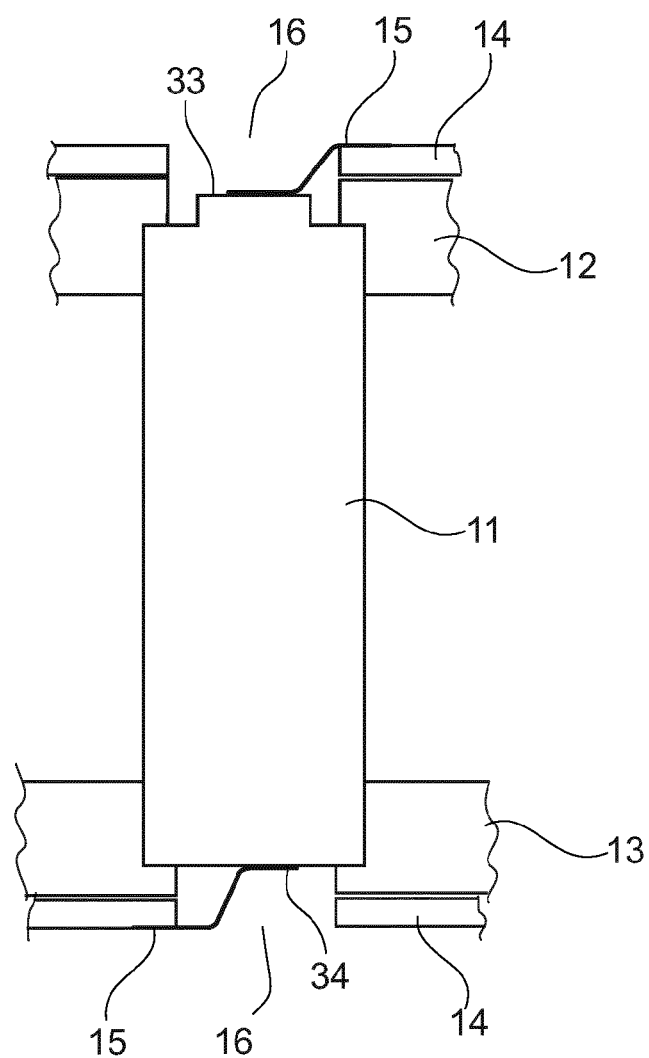
FIG. 3a shows a sectional view of a battery cell which is accommodated in a battery pack according to the invention.
Figure 3B:
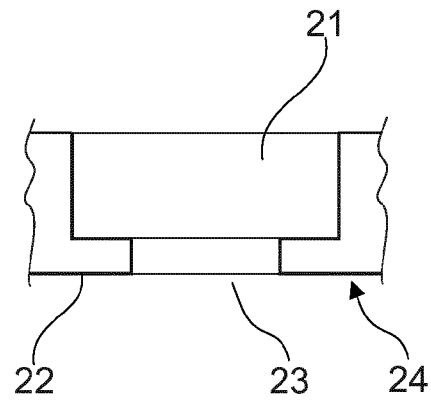
FIG. 3b is a sectional view of receiving opening or a connection opening of a support structure.

In FIGS. 3a and 3b, sectional views of a battery cell 11 or the support structures 12, 13 with the connection structures 14 are shown. Referring to FIG. 3a, a battery cell 11 is received in upper and lower support structures 12, 13. As can be seen from FIG. 3B, each of the support structures 12, 13 has receiving openings 21 and connection openings 23. Thus, a battery cell 11 is inserted with its end side into a receiving opening 21, and then the electrical connection contact of the battery cell 11 can be accessed through the connection opening 23. The electrical connection contacts 33 and 34 of the battery cell 11 are below the top side or bottom side of the support structure 12, 13. That is, the electrical connection contacts 33 and 34 are located lower than the surfaces of the support structures 12, 13, on each of which the connection structures 14 are placed. According to FIG. 3b, the region in which the battery cell 11 is received includes projections 22 which may be formed as single projections or may project into the opening as a circular flange or rim. The dimensions of the receiving openings 21 are adapted to the outer dimensions of the battery cells 11. Above or on the support structures 12 and 13, the connection structures 14 are arranged, each made of an electrically conductive material. The connection structures 14 each have contact openings 16. Through these contact openings 16, connection elements 15 are passed, which are preferably fastened to the connection structure 14 by means of a joining process such as friction welding or ultrasonic welding. Thus, the connection element 15 extends into the contact opening 16 and is connected to the electrical connection contacts 33 and 34 of the battery cell 11 by a common contacting method such as spot welding, soldering or the like.

Figure 4:
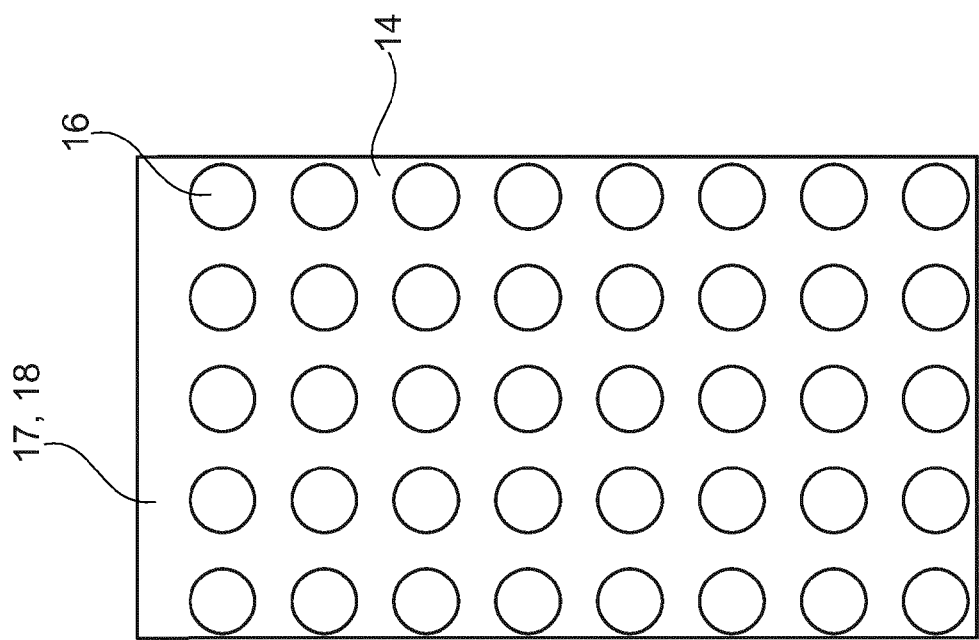
FIG. 4 is a view of a connection structure from above.

In FIG. 4 a connection structure 14, which has corresponding contact openings 16, is shown in a view from above. The number of contact holes 16 corresponds to the number of battery cells 11 included in the battery pack 10. The size of the contact opening 16 is chosen such that a connection element 15 may be passed through the contact opening 16 and may be contacted to the electrical connection contacts 33, 34 of the battery cell 11. The connection structure 14 according to FIG. 4 also includes a battery pack connection region 17, 18, to which the lines of chargers or loads can be connected. When combining a plurality of battery packs 10, the plurality of battery packs are connected to each other at their battery pack connection regions 17, 18. In such a case, the individual connection structures 14 are each configured for the total current of the interconnected battery packs.

Figure 5:
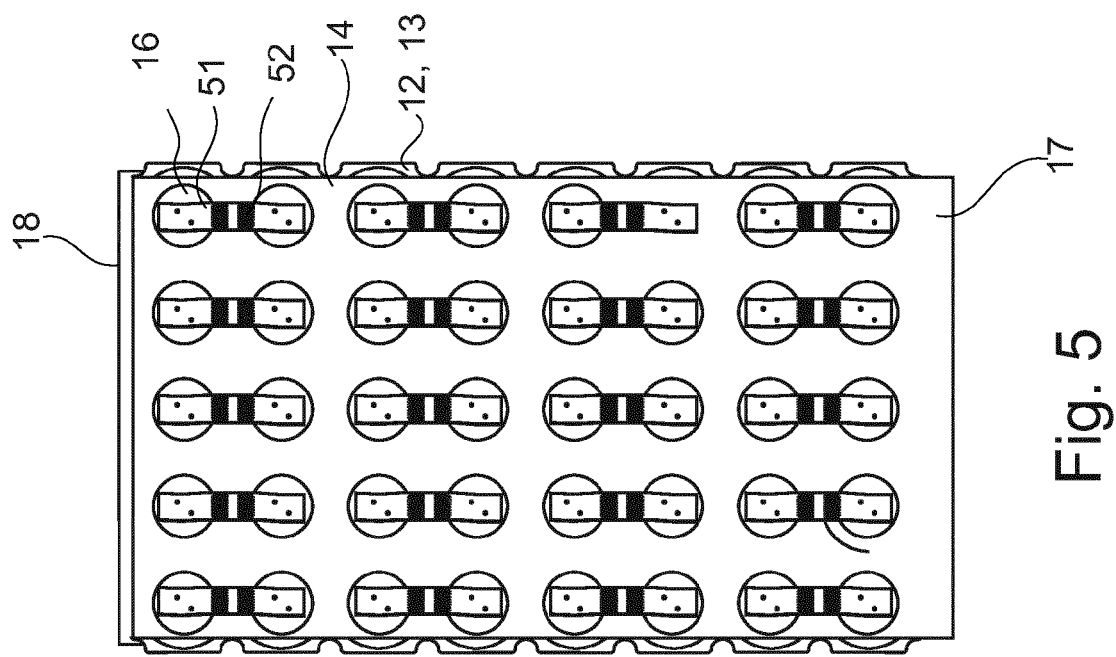
FIG. 5 is a view of the battery pack according to another embodiment from above.

FIG. 5 shows another embodiment of the battery pack according to the invention. In this embodiment, the connection elements 51 are configured such that a connection element 51 is strip-shaped and protrudes into two adjacent contact openings 16, respectively. This strip-shaped connection element 51 is connected to the connection structure 14 at the peripheral regions of the corresponding contact holes 16 at a respective connection pad 52. The strip-shaped connection element 51 extends into the corresponding contact holes 16 and, from there, is connected to the electrical connection contacts 33, 34 of the corresponding battery cell 11. As is apparent in this embodiment, electrical connection contacts 33, 34 of similar type are located on one side of the battery pack 10, that is, either the positive or the negative terminals of the battery cells 11.

Figure 6:
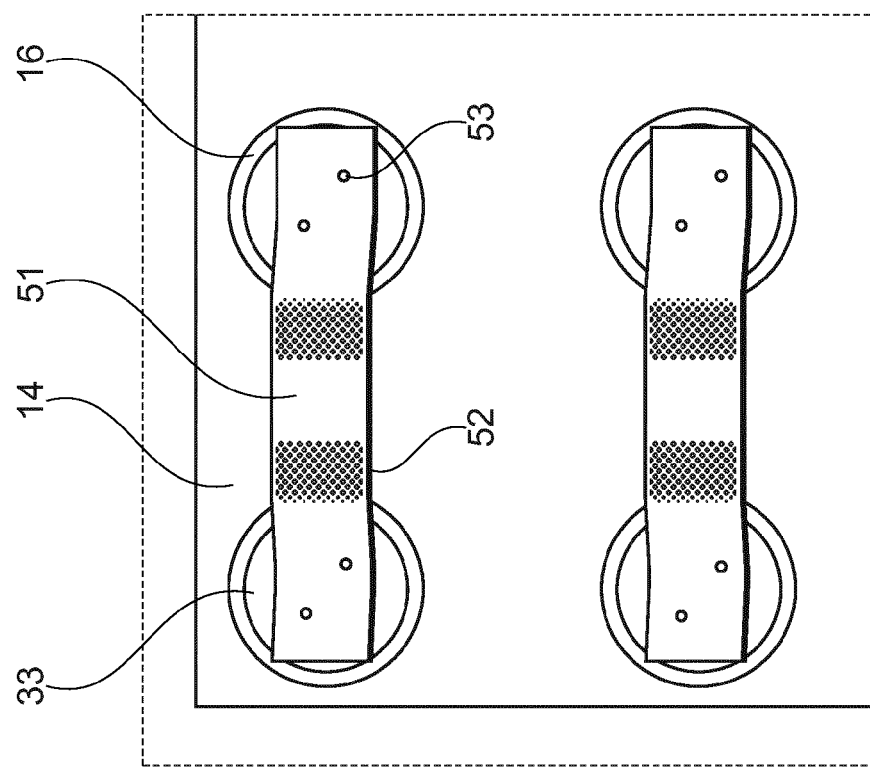
FIG. 6 is an enlarged view of a portion of FIG. 5.

FIG. 6 shows an enlarged view of a portion of FIG. 5, in which a connection structure 14 is connected to the respective battery cells 11 via a strip-shaped connection element 51 which projects into two contact openings 16. Of the battery cells 11, for example, the connection contact 33 can be seen, said connection contact 33 being connected to the strip-shaped connection element 51 via solder joints or welds 53. In this embodiment, the strip-shaped connection element 51 is connected to the connection structure 14 by means of two connection pads 52. In a further embodiment, it is possible, that this strip-shaped connection element 51 is connected to the connection structure 14 only at one connection point 52, respectively, so as to reach a more efficient and less elaborate joining method between the connection structure 14 and the strip-shaped connection element 51.

Figure 7:
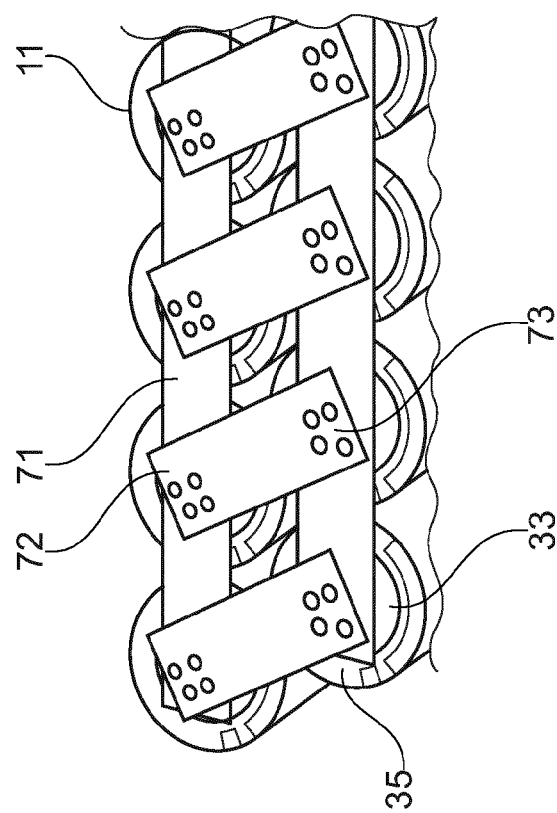
FIG. 7 is a battery pack from the prior art.

FIG. 7 illustrates a conventional battery pack, in which a plurality of battery cells 11 are connected in parallel. As is apparent from the drawing, the individual battery cells 11 are directly connected to each other by means of the strip-shaped connection elements 71 and 72, wherein the connection pads 73 provide both the connection between the transversal connections 72 and the longitudinal connections 71 and the underlying electrical connection contact 33 of the battery cell 11. Thus, the heat, which arises when connecting transversal and longitudinal connections 71 and 72, is also passed directly to the underlying connection contact 33, so that the battery cell 11 is exposed to the heat input during the assembly process. Too much heat may also damage the insulation 35 of the battery cell 11.

When connecting the battery cells 11 as shown in FIG. 7, large heat input occurs, which may be transferred to the battery cells 11 and may result in dangerous situations. Moreover, a failure of a battery cell 11 may result in a failure of the entire battery pack, since it may come to a melting of the transversal connection 72 or the longitudinal connection 71. Thus, the battery cell 11 causing the high current is not reliably isolated from the other battery cells 11 so that dangerous chain reactions can result and, ultimately, more battery cells 11 can outgas and explode.

When charging a battery pack according to FIG. 7, the battery cells 11 which are located on the current supply side are supplied with more current than they are with a connection structure 14 according to the present invention. Through the strip-shaped transversal and longitudinal links 71 and 72, no reliable distribution of the supplied current is possible. Consequently, the battery cells 11 located on the current supply side are heated more than the battery cells 11 that are farther away from the current supply.

A further advantage of the configuration according to the invention results from the thermal decoupling of the connection structure 11 and the connection contact 33, 31 of the battery cell 11. Due to the distance between the connection structure 14 and the connection contact 33, 34, heat input due to a high current or due to the creation of a connection at the connection pad 52 between the connection element 51 and the connecting structure 14 cannot be transferred to the battery cell 11 in the connection structure 14, as is apparent in FIG. 3*a*. The distance can be adapted by means of the projections 22 and the edge of the support structures 12, 13. Thus, for large battery packs with many battery cells 11 and, consequently, a high current at the connection structure 14, a support structure 12, 13 can be used, wherein the at least one protrusion 22 is formed thicker than in a support structure 12, 13 configured for few battery cells 11. Consequently, the battery cell 11 is spared the stress resulting from that heat input and only exposed to the heat input during the creation of the connection between the connection element 15, 51 and the connection contact 33 and the heat input by its own current flow.

The size of the battery pack according to the invention may be varied as desired by choosing the number of battery cells. In addition, the shape of the battery pack can be adjusted to the respective application via the number and arrangement of the battery cells. If, for example, several interconnected battery packs are employed in a vehicle, it is possible, in case of failure of one or more battery cells, to replace only the battery pack with the failed battery cells, resulting in substantial economic benefits.

Figure 8:
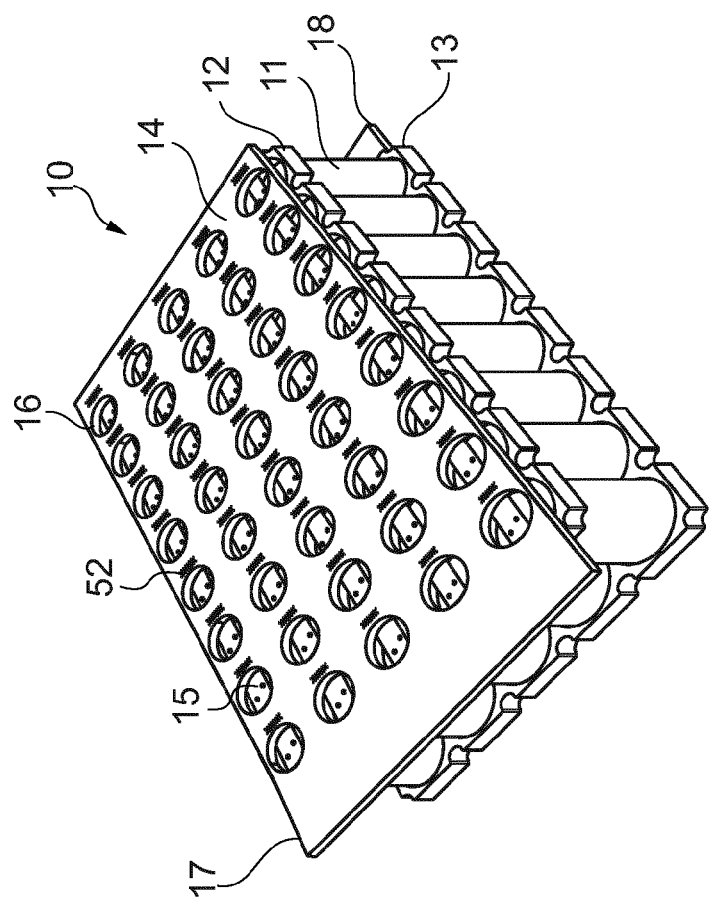
FIG. 8 shows a perspective view of a battery pack according to another embodiment of the invention.

FIG. 8 shows a battery pack according to a second embodiment of the present invention.

The battery pack 10 consists of two connection structures 14. Furthermore, two support structures 12 and 13 are provided. The battery cells 11 are inserted into receiving openings 21 of the support structures 12, 13 not shown in detail or received in these. The connection structures 14 resting on both outward surfaces of the support structures 12 and 13 are formed similarly to the connection structures of the first embodiment.

Unlike in the first embodiment, here the connection elements 15 are arranged between the downwardly facing surface 24*a* of the upper connection structure 14 and the upwardly facing surface 24 of the first support structure 12 or, for the connection structure 14 arranged below in FIG. 8, the connection elements 15 are arranged on the upwardly facing side. This has the advantage that the connection elements 15 which are preferably made of a nickel or Hilumin strip do not have to be bent as strongly as in the first embodiment.

In the manufacture of the battery pack 10, the battery cells 11 may thus be inserted into the support structures 12, 13 in two separate or parallel operations and are held together, for example, by the fasteners 25. At the same time the connection structures 14 with the contact openings 16 and the connection elements 15 may be manufactured, wherein the connection elements 15 are respectively arranged such that they project into the associated contact opening 16. The connection between the respective connection element 15 and the connection structure 14 is, in analogy to the first embodiment, created by friction welding or by ultrasonic welding. After all the connection elements 15 have been fastened to the connection structure 14, the connection structure 14 is inverted and placed on the upwardly or outwardly facing surface 24 of the support structure 12 or 13. In addition, an insulating layer may be inserted between the support structures 12 and 13 and the respective connection structure 14.

Holding the support structures 12 and 13 together by means of the fasteners 25 is not necessary, but in particular the manufacturing process of the battery pack 10 is made easier and safer. Optionally, it may also be sufficient to use the clamping effect between the battery cells 11 and the receiving openings 21 both during the manufacturing process and during the insertion of the battery pack 10, such that the support structures 12 and 13 are held together sufficiently.

After the connection structure 14 with the connection elements 15 has been put or placed on the pre-manufactured battery pack 10 consisting of the battery cells 11 and the two support structures 12 and 13, the connection structure 14 may be fastened to one of the support structures 12, 13 by means of additional fasteners 26. It is also possible to pass a fastener through the battery pack 10 and to screw it together on the opposite sides of the connection structures 14. Thus, the connection structure 14 with the connection elements 15 is fixed with respect to the support structures 12 and 13 and the battery cells 11 received therein. Now, in a further process, the electrical connection between the respective connection elements 15 and the positive and negative electrical contacts 33, 34 of the battery cell 11 can be established. The provision of fasteners 26 is not mandatory. Depending on the application, that is, for example, if there is little mechanical stress such as vibrations and the like acting on the battery pack 10, the connection between the connection elements 15 and the connection contacts 33, 34 of the battery cells 11 is sufficient for fixing the connection structures.

Such an arrangement of the connection element 15 between the connection structure 14 and the support structure 12, 13 or the electrical connection contact 33 or 34 has the advantage that the connection element 15 must be mechanically bent only by a minimal amount. As a result, during the manufacturing of the connection by friction welding or ultrasonic friction welding, the connection elements 15 may just be placed in the region of the contact pads 52 next to the corresponding contact opening 16 and be connected to the connection structure 14. After all the connection elements 15 have been connected to the connection structure 14, the connection structure 14 is inverted so that the connection elements 15 are located between the support structure 12, 13 and the connection structure 14, and thus are placed almost directly on the electrical contacts 33, 34 of the battery cell 11. Then, the other electrical connection to the electric connection contact 33, 34 of the battery cell 11 can be created. Since the connection element 15 must no longer be bent as strongly as in the first embodiment, the electrical connection can be manufactured more reliably and less contact failures arise. Moreover, no tensile forces affecting the connection negatively, which are caused by spring-back forces of strongly bent connection elements 15, arise.

Another advantage resulting from this embodiment is that during the mechanical stress during operation of the battery pack, e.g., due to the occurrence of vibration, the connection elements 15 are subjected to less mechanical tension and thus a breaking of contact between a connection element 15 and the electrical connection contacts 33 and 34 of the battery cell 11 is largely avoided. In addition, an important advantage in this embodiment is that the connection points between the connection elements 15 and the connection structures 14 are protected against external influences which can be, for example, of mechanical nature. Moreover, a completely flat surface facing away from the battery cells 11 is created, which facilitates in particular the application of a cover film or a coating.

Figure 9:
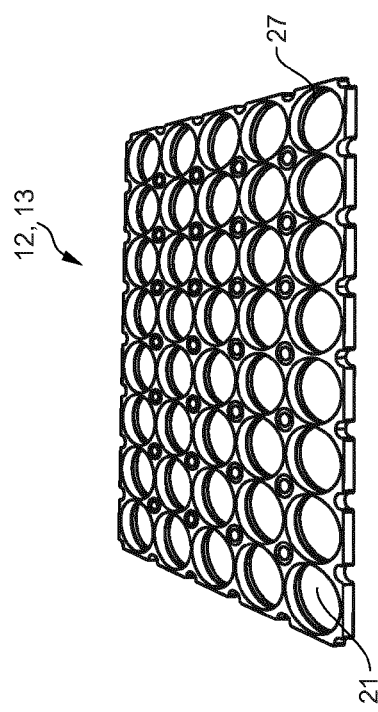
FIG. 9 shows a perspective view of a support structure according to another embodiment.

FIG. 9 shows an alternative embodiment of the support structures 12 and 13. The alternative embodiment of the support structure 12, 13 includes, in contrast to the connection structure in FIG. 2, a circumferential flange 27, which forms the boundary of the receiving opening 21 for the inserted battery cell 11. The opening having the smaller diameter, which extends inside the flange 27, is the connection opening 23 and the opening, which is directed upwards in the illustration of FIG. 9 and has a larger diameter than the connection opening 23, is the receiving opening 21.

The manufacturing of the support structure 12, 13 of FIG. 9 is simpler in comparison with the support structure shown in FIG. 2. Thus, the support structures 12, 13 with the receiving opening 21 and the connection opening 23 can be manufactured very economically in a simplified injection moulding method or by chipping.

Figure 10:
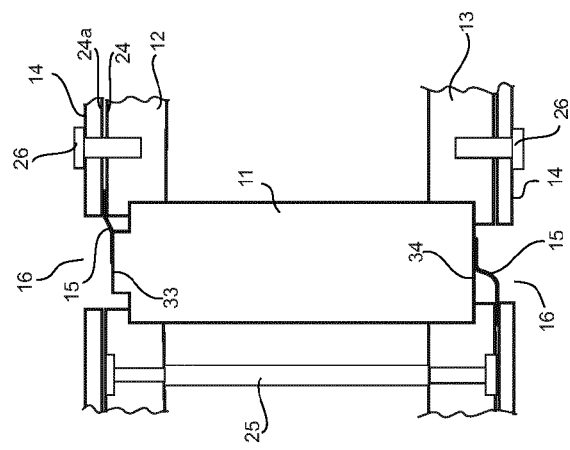
FIG. 10 shows a sectional view of the battery pack according to the second embodiment of the invention.

FIG. 10 shows a sectional view of the battery pack 10 according to FIG. 8. A battery cell 11 is inserted between the first and second support structures 12 and 13, and is held by the respective receiving openings 21, The inwardly projected flange 27 is not shown here, but projects beyond the upper or lower end edge of the battery cell 11 into the respective opening of the support structure 12, 13. The positive and negative electrical connection contacts 33 and 34 are located within the support structure 12, 13 and are thus protected from premature contact during the placement of the connection structures 14. The connection structure 14 includes contact openings 16, wherein the connection elements 15 project into these contact opening 16, Here, the connection element 15 is bent or mechanically deformed much less strongly than in the embodiment of FIG. 3A. Moreover, FIG. 10 shows a first fastener 25, which holds together the first and the second support structure 12 and 13 with the inserted battery cells 11, For this purpose, two screws are inserted into bores of the support structures 12, 13 and respectively engage with a thread of a sleeve 25. Moreover, another fastener 26 is shown, which screws the connection structures 14 and the support structures 12, 13 together.

The fasteners 25, 26 are means to be used depending on the application. Hence, there are applications in which these fasteners 25, 26 may be omitted, and there are applications in which only one or the other fastener 25 or 26 or both fasteners 25, 26 may be used. In particular, the choice of using the fasteners 25, 26 is determined by the question, if the battery pack 10 is subjected to external influences, and if so, to which kind.

In one embodiment, a battery pack comprises: at least two battery cells (11), wherein each battery cell (11) has a positive and a negative electrical connection contact (33, 34), wherein a first connection structure (14) is associated with the electrically positive connection contacts (33) of the battery cells (11) and a second connection structure (14) is associated with the electrically negative connection contacts (34) of the battery cells (11) and each connection structure (14) has a current capacity corresponding to the sum of the individual currents of each connected battery cell (11), wherein each battery cell is connected to the first connection structure (14) via at least one connection element (15, 51) and is connected to the second connection structure (14) via at least one further connection element (15, 51), wherein a cross section of the respective connection element (15, 51) is adjusted to a predetermined maximum current of a battery cell (11).

In particular, the at least two battery cells 11) are connected in parallel, wherein each of the positive and negative electrical connection contacts (33, 34) is associated with one connection structure (14).

In particular, the battery pack (10) further comprises at least one support structure (12, 13) for receiving the at least two battery cells (11).

In particular, the at least two battery cells (11) are configured as round cells.

In particular, the electrical connection contacts (33, 34) of the battery cell (11) are arranged at opposite end faces of the battery cell (11).

In particular, a first support structure (12) is arranged on the side of the positive electrical connection contacts (33) and a second support structure (13) is arranged on the side of the negative electrical connection contacts (34).

In particular, the support structure (12, 13) comprises receiving openings (21) for receiving at least a portion of the outer shape of each battery cell (11) of the battery pack.

In particular, each receiving opening (21) has a predetermined depth for the spatial fixation of the battery cell.

In particular, the arrangement of the receiving openings (21) in the support structure (12, 13) defines a distance between the battery cells (11) of the battery pack which are inserted into the receiving openings (21).

In particular, the connection structure (12, 13) comprises connection openings (23) for each battery cell (11) of the battery pack (10), wherein the connection openings (23) each allow an electrical contacting of the battery cells (11) inserted into the receiving openings (21).

In particular, the receiving opening (21) is larger than an associated connection opening (23).

In particular, the support structure (12, 13) comprises a receiving side for receiving the battery cells (11) and a connecting side for an electrical connection of the battery cells (11), wherein the receiving side is arranged opposite the connection side.

In particular, the connection openings (23) of the connection structure (12, 13) are arranged on the connection side.

In particular, the first connection structure (14) which is electrically connected to positive connection contacts (33) is arranged opposite the second connection structure (14) which is electrically connected to the negative connection contacts (34).

In particular, the first connection structure (14) is arranged on the connection side of the first support structure (12) and the second connection structure (14) is arranged on the connection side of the second support structure (13) and the battery cells (11) are provided between the first support structure (12) and the second support structure (13).

In particular, each connection structure (14) includes a battery pack connection region (17, 18).

In particular, the battery pack connection region (17, 18) protrudes beyond an outer edge of the respective support structure (12, 13).

In particular, there are two battery pack connection region (17, 18), which are arranged diagonally opposed at the battery pack (10).

In particular, each connection structure (14) is made of an electrically conductive material and formed flat in order to allow a uniform current distribution to all the connected battery cells (11).

In particular, the connection structure (14) is formed from a first metal, preferably copper, or from a different electrically conductive material.

In particular, time connection element (15, 51) is formed from a second metal, preferably a nickel strip (Hilumin strip), or from a different electrically conductive material.

In particular, the connection structure (14) comprises contact openings (16) associated to the connection openings (23) of a support structure (12, 13), respectively.

In particular, the contact openings (16) of the connection structure (14) each expose the connection openings (23) of the support structure (12, 13) and a corresponding contact region of the positive or negative connection contact (34, 33) of the battery cell (11).

In particular, the connection elements (15, 51), which are each fixed to the connection structure (14) by means of a joining method, protrude into the respective contact openings (16).

In particular, the connection elements (15, 51) are fastened to the connection structure (14) by means of friction welding or ultrasonic welding.

In particular, the connection element (15, 51) is connected to the electrical connection contact (34, 33) of the battery cell (11) by means of a material connection.

In particular, the connection element (15, 51) is connected to the electrical connection contact (33, 34) of the battery cell (11) by means of spot welding connection or a solder connection.

In particular, the connection element (15, 51) has a cross-section which melts at a current above a maximum charge or discharge current and interrupts the connection between the connection structure (14) and the electrical connection contact (33, 34) of the battery cell (11).

In particular, a heat insulating layer, preferably made of Teflon, is disposed between the connection structure (14) and the connection side of the support structure (12, 13).

In particular, the cross-section of the connection element (15, 51) is configured such that a uniform current distribution is achieved during the charging of the battery cells (11) connected in the battery pack (10).

In particular, the support structure (12, 13) is formed from a temperature-resistant and electrically non-conductive material, preferably thermoset.

In particular, the dimensions of the receiving opening (21) are adapted to the outer circumference of the battery cell (11) to be received and the receiving opening (21) exerts a clamping effect on the battery cell (11).

In particular, the outer dimensions of the connection structure (14) essentially correspond to the outer dimensions of the support structure (12, 13).

In particular, the connection structure (14) comprises connecting pads (52) for respective attachment of the connection elements (15, 51), the dimensions of which correspond to at least the square area of the width of the connection element (15, 51), respectively.

In particular, at least one fastener is arranged between the first and the second support structure (12, 13) in order to hold the two support structures (12, 13) with the inserted battery cells (11) together.

In particular, the battery cells (11) are fixed in the receiving openings (21) by means of an adhesive.

Further, a method of manufacturing a battery pack is provided, comprising: inserting at least two battery cells (11) into a support structure (12, 13), connecting a connection structure (14) to one connection element (15, 51) per battery cell (11), connecting the connection elements (15, 51), which are connected to the connection structure (14), to electrical connection contacts (33, 34) of the battery cell (11).

The invention claimed is:

1. A battery pack, comprising:
at least two battery cells (11), wherein each battery cell (11) has an electrically positive and an electrically negative connection contact (33, 34), which are arranged on opposite sides of the battery cell (11),
wherein all electrically positive connection contacts (33) of the at least two battery cells (11) are connected to a first connection structure (14), and all electrically negative connection contacts (34) of the at least two battery cells (11) are connected to a second connection structure (14),
wherein the first connection structure (14) has a positive potential and represents a positive connection terminal of the battery pack and the second connection structure (14) has a negative potential and represents a negative connection terminal of the battery pack;
wherein the first connection structure (14) and the second connection structure (14) have a similar flat shape and are arranged on opposite sides of the battery pack (10), and each of the first and second connection structures (14) is formed to have a flat surface so as to allow a uniform current distribution to all connected battery cells (11) and has a current capacity corresponding to the sum of the individual currents of each connected battery cell (11),
wherein each electrically positive connection contact (33) of the at least two battery cells (11) is connected to the first connection structure (14) via at least one connection element (15, 51) and
wherein each electrically negative connection contact (34) of the at least two battery cells (11) is connected to the second connection structure (14) via at least one further connection element (15, 51),
wherein the connection elements (15, 51) have a flat strip shape and a cross section of the respective connection element (15, 51) is dimensioned to support a predetermined maximum current of one battery cell (11);
wherein the connection elements (15, 51) are connected to a side of the first and second connection structure (14) correspondingly facing the battery cells (11),
wherein an electrically non-conducting first support structure (12) is arranged on the side of the positive electrical connection contacts (33), and an electrically non-conducting second support structure (13) is arranged on the side of the negative electrical connection contacts (34), wherein the first support structure (12) and the second support structure (13) are formed in a similar shape and respectively comprise receiving openings (21) for respectively receiving opposite end portions of the outer shape of each battery cell (11) of the battery pack, wherein outer dimensions of said first and second connection structures (14) substantially corresponds to outer dimensions of the first and second support structures (12, 13), wherein the first connection structure (14) covers the first support structure (12) and the second connection structure (14) covers the second support structure (13) such that the first and second connection structures (14) constitute outermost opposing surfaces of the battery pack, without any parts protruding perpendicular to said opposing surfaces, wherein the first and second connection structures (14) each comprise connecting pads (52) for respective attachment of the flat strip shaped connection elements (15, 51), each of the connecting pads (52) being dimensioned to correspond to at least a square area of a width of the flat strip shape of the connection element (15, 51) associated therewith, wherein the first connection structure (14) includes a first connection region (17) defining the positive connection terminal at an upper side of the battery pack (10) and the second connection structure (14) includes a second connection region (18) defining the negative connection terminal at an opposing lower side of the battery pack (10), the first and second connection regions (17, 18) being diagonally opposed relative to each other such that the first connection region (17) is located on a left side of the first connection structure (14) at the upper side of the battery pack (10) and the second connection region (18) is located on an opposing right side of the second connection structure (14) at the opposing lower side of the battery pack (10).

2. The battery pack according to claim 1, wherein the first and second connection structure (14) in the assembled state rests on the surface (24) of a first and second support structure (12, 13) respectively and the connection elements (15, 51) penetrate the connection openings (23).

3. The battery pack according to claim 1, wherein at least one fastener (25) is arranged between the first and the second support structure (12, 13) in order to hold the two support structures (12, 13) with the inserted battery cells (11) together.

4. The battery pack according to claim 3, wherein the fastener (25, 26) is formed from an electrically non-conductive material or is surrounded by an electrically insulating material.

5. The battery pack according to claim 1, wherein the at least two battery cells (11) are connected in parallel, wherein the electrically positive and negative connection contacts (33, 34) are each associated with the first and second connection structure (14), respectively.

6. The battery pack according to claim 1, wherein the battery cells (11) are configured as round cells and the electrically positive and negative connection contacts (33, 34) of the battery cell (11) are arranged on opposite end faces of the battery cell (11).

7. The battery pack according to claim 1, wherein the first and second support structures (12, 13), respectively, comprise a receiving side for receiving the battery cells (11) and a connecting side for an electrical connection of the battery cells (11), wherein the receiving side is arranged opposite the connection side.

8. The battery pack according to claim 1, wherein the first connection structure (14) is arranged on the connection side of the first support structure (13) and the second connection structure (14) is arranged on the connection side of the second support structure (13) and the battery cells (11) are arranged between the first support structure (12) and the second support structure (13).

9. The battery pack according to claim 1, wherein the first and second connection structures (14), respectively, comprise contact openings (16) which are each associated with the connection openings (23) of the first and second support structures (12, 13), respectively.

10. The battery pack according to claim 1, wherein the contact openings (16) of the first and second connection structures (14) each expose the connection openings (23) of the first and second support structure (12, 13), respectively, and a corresponding contact region of the electrically positive or negative connection contact (34, 33) of the battery cell (11).

11. The battery pack according to claim 1, wherein the connection element (15, 51) has a cross-section which melts at a current above a maximum charge or discharge current and interrupts the connection between the first and second connection structures (14) and the electrically positive and negative connection contacts (33, 34) of the battery cell (11), respectively.

12. The battery pack according to claim 1, wherein the cross-section of the connection element (15, 51) is configured such that a uniform current distribution is achieved during the charging of the battery cells (11) connected in the battery pack (10).

13. The battery pack according to claim 1, wherein the first and second support structures (12, 13) are formed from a temperature-resistant and electrically non-conductive material.

14. The battery pack according to claim 1, wherein the dimensions of the receiving opening (21) are adapted to the outer circumference of the battery cell (11) to be received and the receiving opening (21) exerts a clamping effect on the battery cell (11).

15. The battery pack according to claim 1, wherein a distance between the receiving openings (21) define a distance between adjacent battery cells (11) for providing sufficient ventilation between adjacent battery cells of the battery pack, and wherein the battery cells (11) are not fully covered at their circumference and partly exposed between the first and second support structures (12, 13) for ventilation of the battery cells.

16. The battery pack according to claim 1, wherein the first connection structure (14) and the second connection structure (14) are arranged parallel to each other on opposite sides of the battery cells (11).

17. The battery pack according to claim 1, wherein neither the first connection structure (14) nor the second connection structure (14) faces more than a single side of the battery cells (11).

* * * * *